Aug. 5, 1969 E. E. ERIKSSON 3,460,090

APPARATUS FOR ERROR CORRECTION IN
A DATA TRANSMISSION SYSTEM

Filed Oct. 13, 1965 2 Sheets-Sheet 1

INVENTOR
ELOF ERIK ERIKSSON
BY Hane and Nydick
ATTORNEYS

Aug. 5, 1969 E. E. ERIKSSON 3,460,090

APPARATUS FOR ERROR CORRECTION IN A DATA TRANSMISSION SYSTEM

Filed Oct. 13, 1965 2 Sheets-Sheet 2

INVENTOR
ELOF ERIK ERIKSSON
BY
Hane and Nydick
ATTORNEYS

United States Patent Office 3,460,090

Patented Aug. 5, 1969

3,460,090

APPARATUS FOR ERROR CORRECTION IN A DATA TRANSMISSION SYSTEM

Elof Erik Eriksson, Bandhagen, Sweden, assignor to Telefonaktiebolaget LM Ericsson, Stockholm Sweden, a corporation of Sweden Filed Oct. 13, 1965, Ser. No. 495,627

Claims priority, application Sweden, Nov. 6, 1964, 13,379/64

Int. Cl. G08b *29/00;* G06f *11/00;* H04l *1/00*

U.S. Cl. 340—146.1 2 Claims

ABSTRACT OF THE DISCLOSURE

A data transmission system includes a transmitter with a bidirectional stepping tape reader, and a source of clock pulses; a receiver including a stepping data recording device responsive to data signals and clock pulses for recording data and the stepping of the recording device only at the simultaneous receipt of data and clock signals; and a data transmission channel for connecting the transmitter to the receiver. The transmitter always transmits clock pulses to the receiver whether or not data signals are simultaneously transmitted. Included in the receiver are error detecting means for detecting mutilated data signals. When such a mutilated signal is detected the error detecting means causes the recording means to stop stepping and to stop recording, and causes the transmission of an error response signal back to the transmitter. When the transmitter receives the error response signal, means cause the tape reader to step in the reverse direction without data signals being transmitted. However, clock pulses are still transmitted. When the receiver then receives a clock pulse without accompanying data signals it terminates the error response signal. The sensing of the termination of this response signal in the transmitter causes the tape reader therein to start stepping in the forward direction and the transmission of data signals.

SPECIFICATION

The present invention relates to data transmission and refers to a circuit arrangement for the automatic correction of errors in the transmission of data symbols on channels with varying propagation times. The arrangement includes a transmitter provided with a bidirectional tape drive and a receiver provided with a device for reading error checking, for example, according to the parity principle.

BACKGROUND

In data transmission through telephone connections errors arise due to transients to such an extent that an automatic correction is desirable. This is achieved by repeating the incorrectly received sign or symbol. Clock pulses originating at the transmitter synchronize pulses for the recording of data symbols and the stepping forward of the receiver with pulses for the reading and the stepping forward or backward of a data source in the transmitter. The time for transmitting a symbol from the transmitter to the receiver and from the receiver to the transmitter is however often so long that several symbols have time to be sent out before the receiver, by means of a response signal, is able to stop the transmitter and indicate that an incorrect symbol has been received. Consequently, heretofore it was necessary to group the symbols into so-called blocks and introduce a control signal that is sent from the receiver to the transmitter. If this signal shows that some symbol in the block was incorrect, all the symbols of the block are retransmitted. If then a recording, for example a repunching of a punched tape, is not desired for the whole block, a counter and a storing device are needed on the receiver side.

THE INVENTION

It is an object of the invention to delete the counter and the storing device.

It is another object of the invention to dispense with the division into blocks and merely retransmit the incorrect symbol and the symbols sent during the time of the transmission of the response signal.

Briefly, the invention contemplates a data transmission system including a transmitter connected, via a data transmission channel, to a receiver. The transmitter includes a bidirectionally steppable tape reader as a source of data signals, and a source of clock pulse signals. The clock pulse signals are continuously transmitted to the receiver while the data signals are only transmitted when the tape reader is stepping in the forward direction. In the receiver there is a steppable data signal recorder. The recorder only steps and records data signals when correct data signals are received simultaneously with a clock pulse signal. An error data signal detector means in the receiver stops the stepping of the recorder and the recording of data signals when erroneous data signals are received, and also transmits an error response signal back to the transmitter. Means in the transmitter sense the occurrence of the error response signal and cause the tape reader to step in the reverse direction. Means in the receiver sense for the occurrence of a clock pulse signal without accompanying data signals to terminate the error response signal, while further means in the transmitter sense for the termination of the error response signal to cause the tape reader to step in the forward direction and again transmit data signals.

The invention will be described more closely with reference to the accompanying drawings, wherein.

Figure 1:
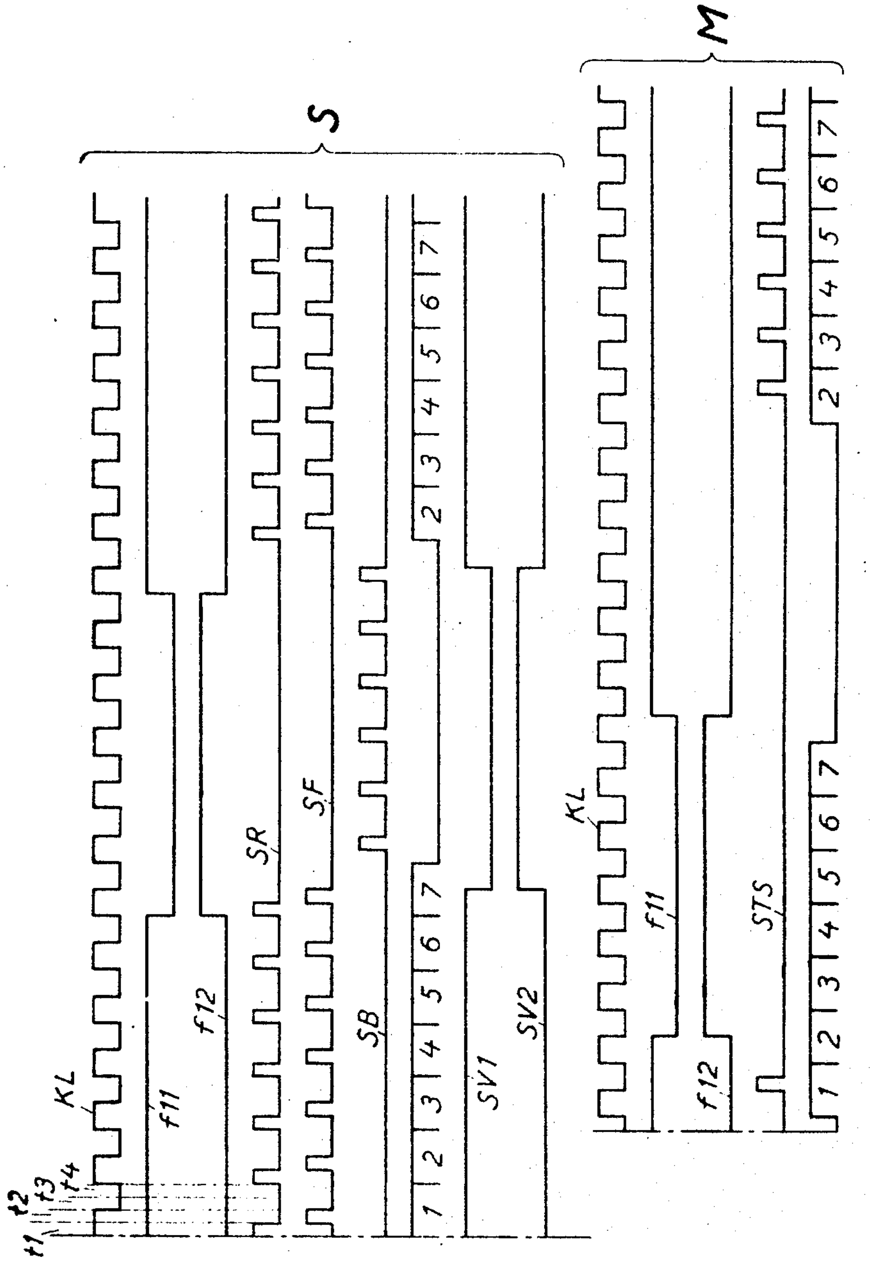
FIG. 1 shows a time diagram for data transmission pulses and control pulses.

In FIG. 1, KL are clock pulses for synchronizing the stepping forward of the transmitter S and of the receiver M. The period of each clock pulse is divided into four portions *t*1, *t*2, *t*3 and *t*4. Response signals or control signals from the receiver to the transmitter occur with D.C. signals *f*11 and *f*12 which are connected and disconnected, respectively, or are changed. The clock pulses are generated in the transmitter and control the reading, and the stepping forward or the stepping backward of a punched tape reader when data symbols are sent. The reading pulses are in the figure indicated by SR. The forward stepping pulses are indicated by SF and the backward stepping pulses by SB. The time interval of the data symbols is indicated by 1, 2 . . . 7.

The clock pulses KL and the response signals *f*11 and *f*12 and the data symbols 1 . . . 7 appears in the receiver with a certain time delay. Pulses for punching and stepping a tape in forward direction in the receiver are indicated by STS.

In FIG. 1, there has been assumed a propagation of about 2¼ clock periods for the signals in both directions and that data symbol 2 has been received incorrectly. The data symbol 1 has been received correctly and has been punched into the tape of the receiver M. During this process the response signal *f*11 is present on the line and in the sender S. When the reading control in the receiver shows that the symbol 2 has been received incorrectly response signal *f*11 will be changed to response signal *f*12 in the receiver M. After 2¼ clock periods a corresponding change will be carried out between signals *f*11 and *f*12 in the transmitter. Then it is assumed that the reading of a symbol 7 has just been started. The clock pulse associated with the reading pulse SR and the forward stepping pulse SF for the symbol 7 is terminated, after which the signals SV1 and SV2 switches the transmitter S from stepping in forward direction to stepping in backward direction. In the receiver M all punching and stepping forward has been stopped as soon as the error in the symbol 2 has been marked. The sending of symbols from the transmitter ceases when the signals SV1 and SV2 have been activated. In this way five symbols, besides the symbol 2, have been sent out. This implies that five clock pulses have been received in the receiver which all are accompanied by a symbol that is not recorded by the receiver. The subsequent clock pulse is not accompanied by any symbol which implies that the receiver switches the response signal from $f12$ to $f11$. After 2¼ clock periods this signal is received in the transmitter S. The clock pulse that then may be in progress is terminated after which the signals SV2 and SV1 will be changed and the transmitter is switched from stepping in backward direction to stepping in forward direction. Reading, sending and stepping in the forward direction are started again in the transmitter. Then the sending with the earlier incorrectly transmitted symbol 2 occurs. If this symbol is now received correctly, it will be punched in the right place on the tape of the receiver. After that the earlier lost, but repeated symbols 3–7, will follow, and then the data transmission continues.

If the incorrectly received symbol 2 again marks an error during retransmission, an alarm will be given and the data transmission is stopped. This will be described more particularly in connection with FIG. 2. From FIG. 2 will also be apparent that a change from forward stepping by means of signal SV1 to backward stepping by means of signal SV2 only can occur during the part $t3$ of a clock period in the transmitter and a change in the other direction, from SV2 to SV1, only at the beginning of the partial times $t1$ and $t3$ while a change between the signals $f11$ and $f12$ in the receiver only can occur at the beginning of the time $t3$ of a clock period in the receiver. Because of such timing a symbol cannot be lost during retransmission.

Figure 2:
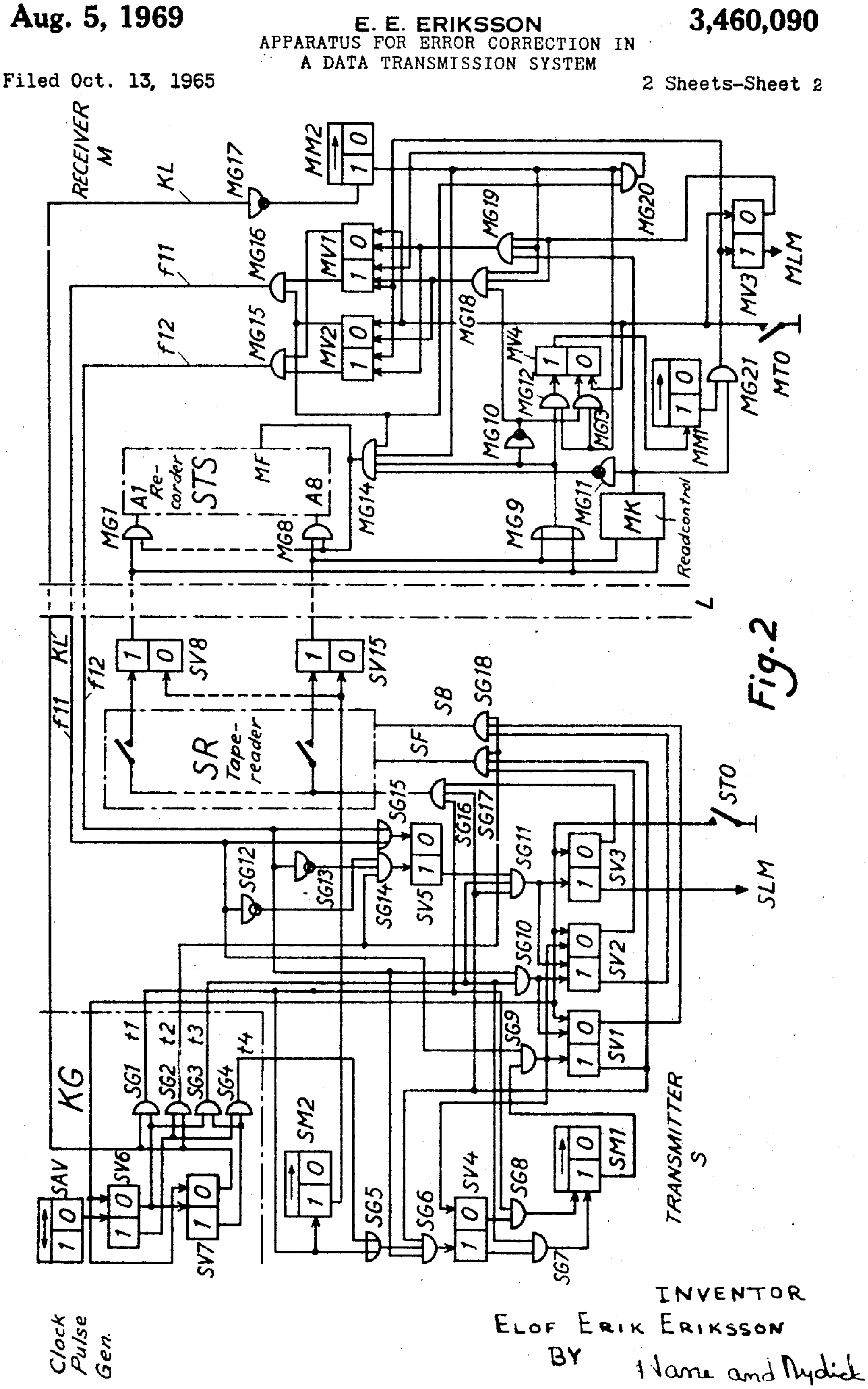
FIG. 2 shows logic circuits for the circuit arrangement according to the invention.

FIG. 2 shows a transmitter S and a receiver M built by means of electronic, logic circuits. A line L with signal channels for clock pulses KL, response signals $f11$ and $f12$ and transmission of data signals $f1$–$f8$ connects the transmitter S and the receiver M. The signal transmission is assumed to be carried out by means of voice frequency signals. Filters, amplifiers and so on for connecting the signals to the line are not shown. The signal channels are independent of each other and simultaneously occurring signals $f1$–$f8$ form data symbols. The data symbols are supposed to be written on a punched tape inserted in the tape reader SR of the transmitter and they are to be transmitted and written on a punched tape in the recording device STS of the receiver. The tape reader SR may be stepped forward by means of pulses on a wire SF and stepped backwards by means of pulses on a wire SB. The signals read are sent out to the line L through bistable circuits SV8–SV15. The tape in the recording device of the receiver may be punched by means of current impulses in the wires A1–A8 and the punched tape is stepped forward by means of pulses in the wire MF.

In the transmitter S there is provided a clock pulse generator KG consisting of an astable circuit SAV, two binary counters SV6 and SV7 and four and-circuits SG1–SG4. Each clock pulse period is divided into four parts of which parts $t1$ and $t2$ occupy a different half of the on time of a clock pulse and $t3$ and $t4$ a different half of the time between two consecutive clock pulses. Included in the transmitter S are two monostable circuits SM1 and SM2, five bistable circuits SV1–SV5, two or-circuits SG5 and SG15, two inverters SG12 and SG13 and 10 and-circuits SG6–SG11, SG14 and SG16–SG18.

In the receiver M there is a device MK for reading control, two monostable circuits MM1 and MM2, four bistable circuits MV1–MV4, one or-circuit MG9, 3 inverters MG10, MG11 and MG17 besides and-circuits MG1–MG8, MG14 for the punching and forward stepping the drive and 8 other and-circuits.

All flip-flops with more than one input work with an or-function, i.e., the flip-flop is switched in response to a signal on either of the inputs. The monostable circuits SM1, SM2, MM1 produce only short pulses having a duration which is small compared with a clock pulse. Monostable MM2 gives a pulse that is sufficient for the recording.

Before a data transmission is started, a telephone call is always exchanged through the line L. Because of this a contact ST0 in the transmitter and a contact MT0 in the receiver are closed and all flip-flops are 0-positioned. After the call the contacts ST0 and MT0 are opened and the clock pulse generator KG starts. When both counters SV6 and SV7 are in 0-position a clock pulse KL is initiated and a pulse $t1$ is sent through the and-circuit SG1. When astable SAV reaches 0-position, counter SV6 will be 1-positioned, the pulse $t1$ is terminated and a pulse $t2$ through the and-circuit SG2 is initiated and last while astable SAV is in 1-position. When astable SAV again is in 0-position, counter SV6 will return to 0-position and counter SV7 is set into 1-position. The clock pulse KL and the pulse $t2$ are terminated and a pulse $t3$ through the and-circuit SG3 is initiated and lasts until astable SAV has again passed the 1-position and again reaches 0-position. Then counter SV6 is switched to 1-position. The pulse $t3$ is terminated and a pulse $t4$ is initiated. Next time astable SAV changes from 1-position to 0-position both counter SV6 and SV7 will be set into 0-position, the pulse $t4$ is terminated, a new clock pulse KL and a new pulse $t1$ are initiated and so on.

When a clock pulse KL is received in the receiver, the inverter MG17 is switched so that the monostable circuit MM2 is prepared for activation. At the termination of the clock pulse, inverter MG17 is restored and monostable MM2 gives an output signal to the and-circuit MG18, the three conditions of which are now fulfilled, i.e., counter MV3 is in 0-position, monostable MM2 in 1-position and, when no data symbol is transmitted, the inverter MG10 gives a signal to and-circuit MG18. The output signal from monostable MM2 switches the bistable circuit MV1 from 0-position to 1-position. The backward response signal $f11$ is connected to the line L. The sending of data symbols can now begin as soon as the clock pulse generator KG reaches the pulse position $t1$. By that the conditions of the and-circuit SG8 are fulfilled, i.e., bistable SV4 is in 0-position and the pulse $t1$ is initiated. The monostable circuit SM1 gives a short output pulse to the and-circuit SG9, the condition $f11$ of which is fulfilled. The bistable circuit SV1 is switched from 0-position to 1-position. The conditions of the and-circuit SG16 become now fulfilled, i.e., circuit SV3 is in 0-position, circuit SV1 is in 1-position and a pulse $t1$ is in progress.

If the punched tape of the reading device SR has such a position that a symbol is read, at least one of the bistable circuits SV8–SV15 is switched from 0-position to 1-position and gives an output signal $f1$–$f8$. At the middle of the clock pulse, the pulse $t1$ will be changed to pulse $t2$ and the conditions of the and-circuit SG17 become fulfilled, i.e., circuit SV1 is 1-positioned, circuit SV2 is 0-positioned and the pulse $t2$ is in progress. The and-circuit SG16 is blocked by the change from $t1$ to $t2$. The wire SF becomes conducting and the tape of the transmitter is stepped forward one stage during the pulse $t2$. During the pulses $t1$ and $t4$ a control is made that no fault indicating signal has been marked from the receiver.

As long as no fault recording exists, the monostable circuit SM2 is activated at the beginning of each clock pulse or pulse $t1$, a short signal is sent from SM2 to the bistable circuits SV8–SV15 which are set into the 0-position and the next symbol is read in by reader SR and the process described above will be repeated.

On the receiver side the conditions of the and-circuit MG14 will be fulfilled at the termination of each clock pulse KL, i.e., circuit MV2 is in 0-position, an output signal is obtained from MM2, no fault indicating signal is transmitted from control MK and inhibitor MG11, a signal from or-circuit MG9 indicates that a symbol is transmitted. The and-circuits MG1–MG8 which correspond to the signals of a symbol transmit a signal to the wires A1–A8 so that the symbol being transmitted is punched on the tape of the receiver. The stepping forward of the tape is prepared by a circuit through the wire MF and is carried out when this circuit is interrupted in the and-circuit MG14.

When the first symbol is received, the bistable circuit MV4 is switched to the 1-position by fulfilling the conditions of the and-circuit MG12 during the output signal from monostable MM2. An output signal without importance is sent if the symbol is correct.

If the reading control MK shows that one symbol has been received incorrectly an output signal will be obtained from control MK. The inverter MG11 blocks the and-circuit MG14 so that all punching and stepping forward of the tape on the receiver side is stopped. At the termination of the clock pulse that contained the incorrect symbol the conditions of the and-circuit MG19 will be fulfilled and a circuit MV1 is switched from 1-position to 0-position simultaneously as circuit MV2 is switched from 0-position to 1-position. The signal $f11$ on the line L is changed to signal $f12$.

If the incorrect symbol was the first symbol that is transmitted after a call, an alarm will be obtained. When the bistable circuit MV4 is switched to 1-position and an output signal is obtained from monostable MM1, the conditions of circuit MG21 will in this case be fulfilled. The bistable circuit MV3 is switched to 1-position and a circuit for an alarm signal is closed through the wire MLM.

If the first symbol at a data transmission is correct and a later transmitted symbol is received incorrectly the recording in recorder STS will be stopped as has been described above, until the symbol transmission ceases, i.e., a clock pulse that is not accompanied by any symbol, is received. In this way the conditions of the and-circuit MG18 become fulfilled again and circuit MV1 is switched to 1-position and circuit MV2 to 0-position. The backward response signal to the transmitter is changed from $f12$ to $f11$. At the same time circuit MV4 is 0-positioned by a signal from and-circuit MG13, the conditions of which become fulfilled when an output signal is obtained monostable from MM2 and no symbol is marked by or-circuit MG9. During the clock pulses that contain a symbol which is received correctly but shall not be recorded, the reading control MK will not be actuated, but the and-circuit MG14 is blocked by the bistable circuit MV2 being in 1-position. The first symbol then received in the receiver is now the one which earlier had been received incorrectly. If this symbol is still incorrect, an alarm is obtained in fulfilling the conditions of and-circuit MG21 as has been described above. Simultaneously as the bistable circuit MV3 is switched from 0-position to 1-position the bistable circuits MV1 and MV2 are both set into the 1-position and the response signals $f11$ and $f12$ are disconnected simultaneously from the line L. When the reading control of the receiver marks an error by exchanging the response signal $f11$ for the response signal $f12$, the conditions of the and-circuits SG6 become fulfilled on the transmitter side when one of the pulses $t1$ or $t4$ exists. The bistable circuit SV4 is therefore set into the 1-position when the response signal $f12$ is initiated during the partial times $t4$ or $t1$ of a clock pulse and the bistable circuit SV1 is 1-positioned. If the response signal $f12$ exists during the partial time $t3$ of a clock pulse the conditions of and-circuit SG10 become fulfilled. The bistable circuit SV1 is set into 0-position and SV2 into 1-position. Then the tape reader SR is switched from forward stepping to backward stepping as the and-circuit SG17 is blocked and the conditions of and-circuit SG18 become fulfilled during the succeeding pulse $t2$. The bistable circuit SV4 is maintained in 0-condition during the backward stepping if the change between signal $f11$ and $f12$ occurs during one of the partial times $t2$ and $t3$ in the transmitter. In the receiver the change from signal $f11$ to signal $f12$ always occurs at the beginning of the time $t3$ of a clock pulse in the receiver. When the receiver senses a clock pulse that does not contain any symbol the response signal is changed from $f12$ to $f11$. This always occurs at the beginning of the partial time $t3$ in the receiver and the signal is supported to be received in the transmitter in about the same position within a clock pulse period in the sender as at the preceding change from $f11$ to $f12$. Because a started sending out of a symbol in the transmitter has to be terminated, the change between forward stepping and backward stepping in the transmitter always occurs during a pulse $t3$. In order to get a margin against variations in the propagation time of the signals through the line L the sending out of a symbol from reader SR to circuits SV8–SV15 is regarded as started already during the time $t4$ and as terminated at the beginning of the time $t2$. Return from backward stepping to forward stepping shall now occur at the beinning of the time $t1$ if the change from signal $f11$ to signal $f12$ has been carried out during one of the pulses $t2$ and $t3$, and at the beginning of the time $t3$ if the change from signal $f11$ to signal $f12$ has been effected during one of the pulses $t4$ and $t1$. The actual process is found recorded by the bistable circuit SV4. Two cases may then occur.

(1) The fault indicating signal reaches the transmitter during one of the pulses $t4$ and $t1$. The bistable circuit SV4 is set into the 1-position. At the beginning of the pulse $t3$ the bistable circuits SV1 and SV2 are switched. The stepping in the backward direction is started. When the backward signal changes from $f12$ to $f11$ of course one of the pulses $t3$, $t4$, $t1$ or $t2$ exists. The first moment of $t3$ must however have passed in order that the number of repeated pulses should become correct. At the beginning of the next pulse $t3$ the monostable circuit SM1 is activated by the and-circuit SG7. The conditions of the and-circuit SG9 become fulfilled during a short pulse from monostable SM1 and the bistable circuits SV1 and SV2 are activated. Circuit SV1 becomes 1-positioned and circuit SV2 becomes 0-positioned. Reader SR is switched from forward stepping to backward stepping. The bistable circuit SV4 is 0-positioned.

(2) The fault indicating signal reaches the transmitter during one of the pulses $t2$ and $t3$. The bistable circuit SV4 is maintained in 0-condition. At the beginning of the pulse $t1$ the bistable circuits SV1 and SV2 are switched. The stepping in the backward direction is started. When the response signal changes from $f12$ to $f11$ there exists of course one of the pulses $t1$, $t2$, $t3$, or $t4$. The first instant of $t1$ must however have passed in order that the number of repeated pulses should be correct. At the beginning of the next pulse $t1$ the monostable circuit SM1 is activated by the and-circuit SG8. The conditions of and-circuit SG9 become fulfilled during a short pulse from monostable SM1 and the bistable circuits SV1 and SV2 are activated, so that reader SR is switched from backward stepping to forward stepping.

The first symbol sent out after a fault recording is the symbol that has been received incorrectly on the receiver side. If it turns out that the symbol is again incorrect during the retransmission both response signals $f11$ and $f12$ will be disconnected. Then the conditions of the and-circuit SG14 become fulfilled during the pulse $t2$ as both inverters SG12 and SG13 give an output voltage. Simultaneously no signal is sent through the or-circuit SG15 and for this reason the bistable circuit SV5 is switched from 0-position to 1-position. The conditions of the and-circuit SG11 will be fulfilled during the pulse $t3$ as circuit SV1 is in 1-position. The bistable circuit SV3 is switched from 0-position to 1-position and an alarm signal is sent out on the wire SLM.

I claim:

1. A data transmission system comprising: a transmitter including a bidirectional tape reader, means for generating data signals only when said tape reader is moving into a first direction and means for generating clock pulses; a receiver including means for generating recording signals upon simultaneous receipt of data signals and clock pulses, means for checking for errors in received data signals; a steppable recording means which records data associated with said recording signals and steps one position for each received clock pulse received coincidentally with error-free data signals; a bidirectional communication channel connecting said transmitter to said receiver; and error correction means, said error correction means comprising means in said receiver, under control of said error checking means, for inhibiting the recording of data by said recording means and the stepping of said recording means and for generating an error response signal whenever said error checking means indicates an error in received data signals, means for transmitting said error response signal to said transmitter, means in said transmitter for causing said tape recorder to move into a second direction while said error response signal is present therein, means in said receiver for terminating said error response signal when a clock pulse is received during the absence of data signals, and responsive to the termination of said error response signal in said transmitter for changing the direction of movement of said tape recorder back to said first direction.

2. In a data transmission system according to claim 1, means in said transmitter for dividing each clock pulse period into four equal parts, a first control device in said receiver for controlling said error response signal to be initiated and terminated at the trailing edge of a clock pulse received in said receiver, and a second control device in said transmitter for controlling the changing from the first to the second direction of stepping to occur only during the fourth of a clock pulse period that follows immediately after the trailing edge of a clock pulse, and the changing from the second to the first direction of stepping to take place at the leading edge of or the trailing edge of a clock pulse dependent on the time of occurrence of the error response signal in said transmitter.

References Cited

UNITED STATES PATENTS

| | | | |
|---|---|---|---|
| 2,703,361 | 3/1955 | Van Duuren | 340—146.1 X |
| 2,706,215 | 4/1955 | Van Duuren | 340—146.1 X |
| 3,001,018 | 9/1961 | Van Dalen | 340—146.1 X |
| 3,263,215 | 7/1966 | Brooke | 340—146.1 |
| 3,340,504 | 9/1967 | Bellinio | 340—146.1 |

FOREIGN PATENTS

| | | |
|---|---|---|
| 983,613 | 2/1965 | Great Britain. |
| 1,014,180 | 12/1965 | Great Britain. |

MALCOLM A. MORRISON, Primary Examiner

CHARLES E. ATKINSON, Assistant Examiner

U.S. Cl. X.R.

178—23